Dec. 2, 1969  D. A. HORN  3,481,176

SPINDLE STRAIGHTENING METHOD AND APPARATUS

Filed Oct. 20, 1967

Delton A. Horn
INVENTOR.

BY Carl B. Fox, Jr.

ATTORNEY 3,481,176
SPINDLE STRAIGHTENING METHOD AND
APPARATUS
Delton A. Horn, 2407 Connorvale Road,
Houston, Tex. 77039
Filed Oct. 20, 1967, Ser. No. 676,807
Int. Cl. B21d 7/10
U.S. Cl. 72—386                    5 Claims

ABSTRACT OF THE DISCLOSURE

The disclosure is of an apparatus for use in straightening the wheel spindles of vehicles, such as automobiles and some light trucks. The apparatus or tool is fastened to the base plate portion of the spindle and force is applied to the tool to cause straightening of the spindle. The straightening is done while the spindle is assembled in place on an automobile, and removal of the spindle is not necessary in order to perform the straightening.

BACKGROUND OF THE INVENTION

Field of the invention

The field of the invention is the field including the repairing of the wheel spindles of automobiles, or the like. The spindles are used to mount the front wheels of the vehicle, and are deployed in the vehicle at the opposite ends of the front wheel suspension assembly.

Description of the prior art

It has not been heretofore known to straighten the wheel spindles of automobiles, the spindles having heretofore been removed and replaced when they have been bent out of line or otherwise damaged. In particular, it has not been known in the prior art to straighten such spindles in situ on the vehicle, without necessity for removing and replacing them after repair.

SUMMARY OF THE INVENTION

The invention pertains to an apparatus or tool for use in straightening wheel spindles of vehicles. The tool is connected to the base plate portion of the spindle and the spindle is straightened, after which the tool is removed. It is not necessary that the spindle be removed from the vehicle, and consequently its replacement is also unnecessary. The spindles are straightened by application of force through the tool so that the spindle is straightened to be properly aligned and positioned while in place on the vehicle.

DESCRIPTION OF THE PREFERRED EMBODIMENTS

Figure 1:
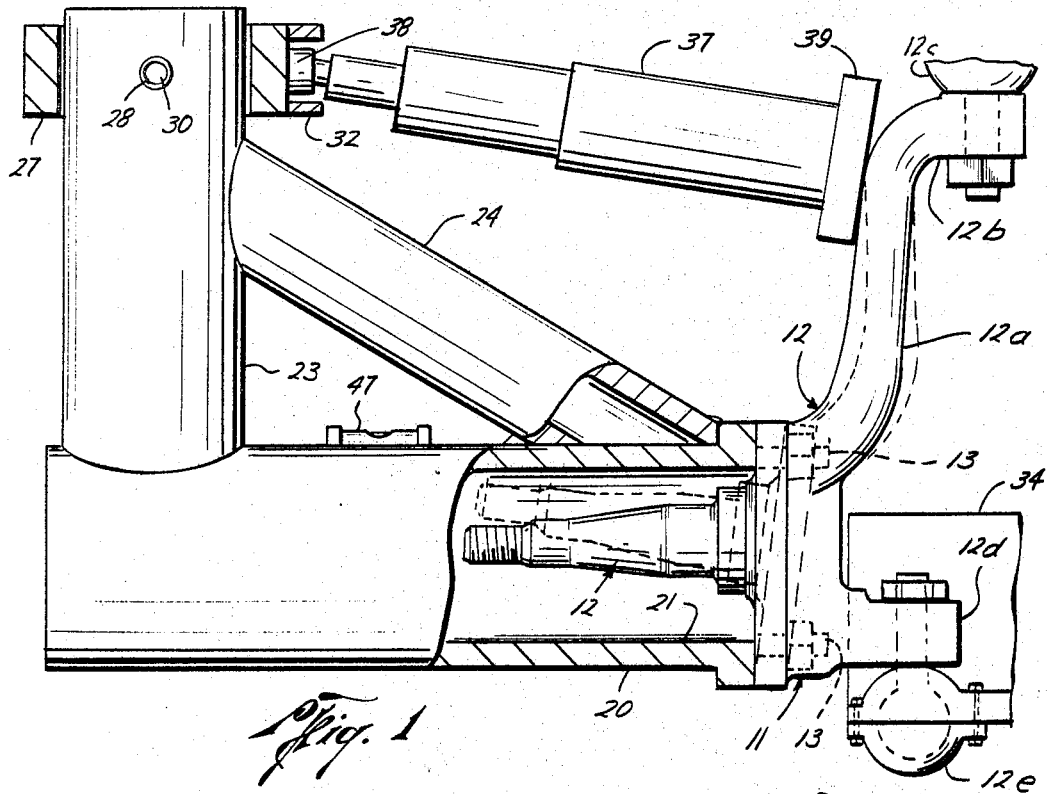
FIG. 1 is a side elevational view, partly in vertical cross section, showing the apparatus or tool in preferred form secured for use in straightening a spindle.
Figure 2:
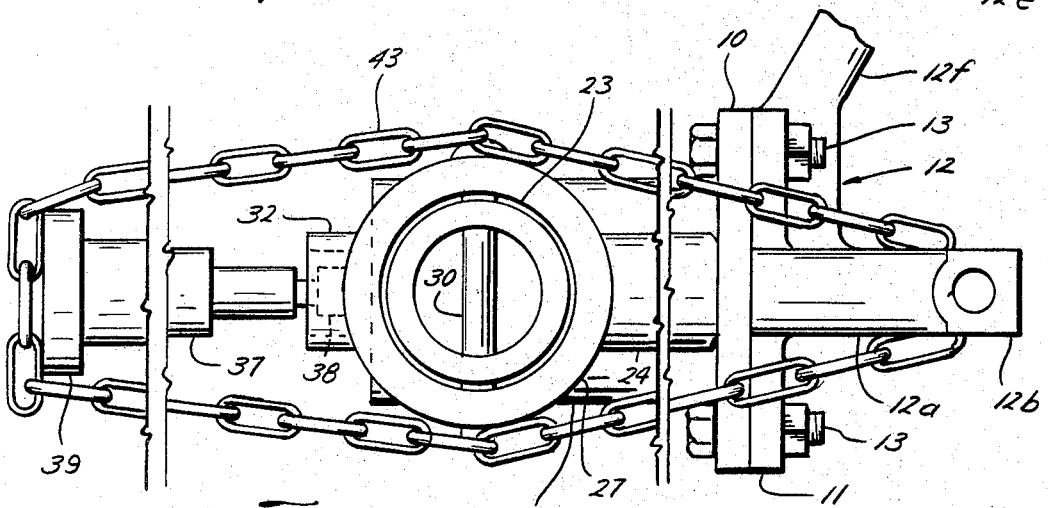
FIG. 2 is a plan view showing another manner of use of the apparatus.

The same apparatus or tool is shown in both FIGS. 1 and 2 of the drawing, but the tool is shown used differently in FIG. 1 than in FIG. 2.

A flange 10, forming an end connection part of the tool, is secured to base plate 11 of spindle 12 by bolts 13, four bolts 13 being shown.

A tubular shaft 20 extends concentrically from flange 10, about a cylindrical passage 21 through the flange and shaft. Spaced from flange 10 on tubular shaft 20 there is provided a laterally extending tubular shaft 23, of somewhat shorter length than shaft 20. While shaft 20 must be provided with a spindle passage or opening therethrough, shaft 23 need not have such a passage and may be formed of solid bar stock. An angular pipe 24 is secured, as by welding at its opposite ends, to members 20, 23 and serves to reinforce the structure. All of the elements 10, 20, 23 and 24 are preferably welded together or otherwise formed in an integral assembly.

A ring-shaped collar 27 is rotatably disposed about the outer end of shaft 23. A perforation or hole 28 through shaft 23, and corresponding opposite holes through collar 27, receive a bolt or pin 30. The collar 27 has at one side a short ring-shaped structure 32, which is welded at one of its ends to the side of collar 27. By removal of bolt or pin 30, collar 27 may be rotated about shaft 23 to position ring 32 either to the side of shaft 23 toward flange 10, or in the opposite direction away from flange 10, the latter position being shown in FIG. 2 of the drawings. Reinsertion of bolt or pin 30 fixes collar 27 in either of these positions.

The apparatus may be of other form than that shown, so long as the operative parts heretofore described and to be described are provided in their proper operational relationships. For example, shafts 20, 23 may be formed by a single curved pipe. Collar 27 and ring 32 may be replaced by a pair of rings 32 welded to opposite sides of shaft 23.

Spindle 12 has an upwardly extending curved arm 12a which terminates upwardly in a perforate bracket 12b having a ball joint 12c connected at its upper surface. A lower bracket 12d has a ball joint 12e connected at its upper surface. The ball joints permit rotation of the spindle for steering of the vehicle and also permit upward and downward pivoting of the vehicle elements onto which the ball joints are affixed. The ball housing of ball joint 12e is formed in a pivotal channel 34 hinged (not shown) to the vehicle frame or body. Ball joint 12c has a housing formed in a similar upper member also hinged for upward and downward movements with respect to the vehicle. The channel member 34 usually has a front spring of the vehicle affixed thereto. The spindle mounting may vary for different makes and types of vehicles.

Spindle 12 has the spindle shaft 35 about which shaft 20 is placed, and to which the bearings and brake drum of the wheel are rotatively affixed. Spindle arm 12f is provided for steering of the vehicle, and is connected for rotative movements of the spindle about ball joints 12c, 12e in response to rotation of the steering wheel of the vehicle.

Since the spindles of different kinds of automobiles vary as to dimensions and design, it is preferred that the passage 21 be of a size capable of receiving spindles of all sizes, and that the flange 10 be capable of attachment to base plates of all customary forms. In some cases it may be desirable that the face of flange 10 be recessed (not shown) around passage 21 in order to accommodate shaped faces of the spindle plates.

Referring now to FIG. 1 of the drawings, a jack 37 is shown disposed with its end part 38 within ring 32, and against the side of collar 27. The base 39 of the jack is positioned against an upper part of arm 12a of the spindle. With the flange 10 firmly secured to spindle plate 11 by the bolts 13 or by other forms of bolts if desired, the jack 37 is disposed as shown in FIG. 1 and operated to act against collar 27 in a direction to move shaft 23 away from the jack support. The spindles when damaged are almost always bent at the lower end of arm 12a, the bending being as indicated by the dashed line position of arm 12a shown in FIG. 1. With arm 12a bent in this manner, plate 11 of the spindle is moved inward (toward the vehicle) at its upper end as also shown by dashed lines in FIG. 1. As jack 37 is extended, the upper part of plate 11 is pulled outwardly to its solid-line position, and arm 12a is straightened to its solid-line position. After the jack has been sufficiently operated to straighten the spindle, the tool may be removed by loosening and removal of bolts 13. The jack, of course, is removed prior to this operation.

Referring now to FIG. 2, the same apparatus is shown as in FIG. 1. The collar 27 is shown rotated about shaft 23 so that ring 32 faces outwardly away from the vehicle. The jack 37 is disposed with its base against the inside of a loop of chain 43 which extends around the upper part of spindle arm 12a and the base of the jack. In this arrangement, operation of the jack forces inward movement of the upper end of the spindle plate 11 and the lower part of arm 12a, so that this arrangement is employed when the spindle has become bent oppositely to the bending shown by dashed lines in FIG. 1. The bending correction is of the same nature as before, except that the bending direction is opposite than that indicated in FIG. 1.

Instead of the loop of chain 43, any encircling device may be disposed about the spindle arm and about the base of the jack for use of the apparatus in this manner.

As shown in FIG. 1, a level indicator 47 may be affixed to the apparatus to indicate when the spindle has been sufficiently straightened by bending of the spindle base plate. The level may be at any convenient location on the apparatus.

While a preferred form of the invention has been shown and described, many modifications thereof may be made by a person skilled in the art without departing from the spirit of the invention, and it is intended to protect by Letters Patent all forms of the invention falling within the scope of the following claims.

I claim:
1. Apparatus for use in straightening wheel spindles, the spindles being of a type including a horizontally disposed shaft portion and a vertical base plate portion and an upstanding arm portion, comprising housing means adapted to freely receive the shaft portion of a wheel spindle, said housing means including connection means at its inner end adapted for connection to the base plate portion of the wheel spindle, said housing means including a transversely extending portion spaced from said connection means, whereby when said connection means is connected to the base plate portion of a wheel spindle in situ on a vehicle force may be applied between the upstanding arm of the wheel spindle and said transversely extending portion of said housing means to cause bending of the spindle to straighten the spindle.

2. The combination of claim 1, said housing means comprising a tubular body the longitudinal passage of which is adapted to freely receive the shaft portion of a wheel spindle, said connection means comprising bolting flange means disposed at the inner end of said body adapted for bolted connection to the base plate portion of the wheel spindle surrounding said shaft portion, said transversely extending portion of said housing means comprising shaft means spaced along said body from said bolting flange means and fixed substantially perpendicularly from a side of said body, said shaft means having surface means spaced from said body adapted to engage force-applying means, the force applied by said force-applying means being transmitted by said shaft, body and flange means to the plate portion of the spindle to straighten the spindle.

3. The combination of claim 2, including angular reinforcing means fixed between means fixed between said body and said shaft means.

4. The combination of claim 2, said shaft means surface means comprising a collar encircling an end portion of said shaft means having an outwardly facing socket means thereon, said collar being rotatable about said shaft means to different positions, and means for fixing said collar in each of said positions, said force applying means comprising a jack the extendable end of which may be received in said socket means in any of the rotative positions of said collar.

5. The combination of claim 4, said flange means including bolt holes adapted for register with the bearing rece bolt holes of the base plate portions of spindles.

References Cited
UNITED STATES PATENTS

| | | | |
|---|---|---|---|
| 174,250 | 2/1876 | Humphreys | 72—386 |
| 1,513,641 | 10/1924 | Simmons | 72—386 |
| 3,143,158 | 8/1964 | Sundquist et al. | 72—386 |

CHARLES W. LANHAM, Primary Examiner

LOWELL A. LARSON, Assistant Examiner

U.S. Cl. X.R.

72—704